(12) United States Patent
Park et al.

(10) Patent No.: US 9,847,690 B2
(45) Date of Patent: Dec. 19, 2017

(54) MOTOR HAVING AN INSULATOR BODY WITH GUIDE LUGS FOR PREVENTION OF SHORT-CIRCUITING

(71) Applicant: LG INNOTEK CO., LTD., Seoul (KR)

(72) Inventors: Young Il Park, Seoul (KR); Byeong Jong Yu, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/167,399

(22) Filed: May 27, 2016

(65) Prior Publication Data
US 2016/0276894 A1   Sep. 22, 2016

Related U.S. Application Data

(63) Continuation of application No. 13/890,904, filed on May 9, 2013.

(30) Foreign Application Priority Data

May 9, 2012   (KR) .................. 10-2012-0049185
May 29, 2012  (KR) .................. 10-2012-0056569

(51) Int. Cl.
*H02K 3/34*   (2006.01)
*H02K 3/38*   (2006.01)
(Continued)

(52) U.S. Cl.
CPC ............ *H02K 3/38* (2013.01); *H02K 1/2733* (2013.01); *H02K 1/28* (2013.01); *H02K 3/34* (2013.01); *H02K 3/522* (2013.01)

(58) Field of Classification Search
CPC .. H02K 1/04; H02K 3/30; H02K 3/32; H02K 3/38; H02K 3/50; H02K 15/10;
(Continued)

(56) References Cited

U.S. PATENT DOCUMENTS 4,206,379 A    6/1980  Onda
7,135,799 B2 * 11/2006 Rittmeyer ............... H02K 3/28
                                                        310/179
(Continued)

FOREIGN PATENT DOCUMENTS

DE   10-2009-003146 A1   11/2010
JP   S50-63505 U          6/1975
(Continued)

OTHER PUBLICATIONS

Office Action dated Mar. 18, 2013 in Korean Application No. 10-2012-0049185, filed May 9, 2012.
(Continued)

*Primary Examiner* — Bernard Rojas
*Assistant Examiner* — Rashad Johnson
(74) *Attorney, Agent, or Firm* — Saliwanchik, Lloyd & Eisenschenk

(57) ABSTRACT

Disclosed is a motor, the motor according to exemplary embodiments of the present disclosure including an insulator body coupled to a stator core wound with a plurality of coils applied with powers of mutually different polarities to prevent the coil and the stator coil from being short-circuited, a terminal housing coupling unit integrally formed with the insulator body to be coupled to a terminal housing supplying an outside power by being circumferentially protruded, and a coil guide unit formed at the terminal housing coupling unit to prevent coils connected to a terminal of each polarity installed at the terminal housing from being short-circuited.

2 Claims, 7 Drawing Sheets

(51) Int. Cl.
*H02K 1/27* (2006.01)
*H02K 3/52* (2006.01)
*H02K 1/28* (2006.01)

(58) Field of Classification Search
CPC .......... H02K 1/2733; H02K 1/28; H02K 3/28; H02K 3/34; H02K 3/345; H02K 3/522
USPC ....... 310/156.09, 215, 216.105, 115, 71, 194
See application file for complete search history.

(56) References Cited

U.S. PATENT DOCUMENTS

| | | | | |
|---|---|---|---|---|
| 7,152,301 | B2* | 12/2006 | Rittmeyer | H02K 3/28 |
| | | | | 29/596 |
| 7,372,181 | B2 | 5/2008 | Kinashi et al. | |
| 7,789,337 | B1* | 9/2010 | Chamberlin | H02K 3/522 |
| | | | | 242/444.3 |
| 8,497,618 | B2* | 7/2013 | Kato | H02K 3/522 |
| | | | | 310/194 |
| 2005/0118886 | A1* | 6/2005 | Cha | H01R 4/185 |
| | | | | 439/810 |
| 2008/0036315 | A1* | 2/2008 | Makiuchi | H02K 3/522 |
| | | | | 310/71 |
| 2008/0100173 | A1 | 5/2008 | Komagata et al. | |
| 2009/0108686 | A1 | 4/2009 | Jeung | |
| 2010/0187923 | A1* | 7/2010 | Migita | H02K 3/522 |
| | | | | 310/71 |
| 2010/0194215 | A1 | 8/2010 | Satoji et al. | |
| 2011/0014068 | A1* | 1/2011 | Tsukamoto | H02K 3/522 |
| | | | | 417/410.1 |
| 2011/0109189 | A1* | 5/2011 | Taema | H02K 3/345 |
| | | | | 310/215 |
| 2011/0285240 | A1* | 11/2011 | Tsukamoto | H02K 3/522 |
| | | | | 310/215 |
| 2012/0112582 | A1* | 5/2012 | Kim | B62D 5/0403 |
| | | | | 310/71 |
| 2012/0126646 | A1* | 5/2012 | Nakagawa | H02K 3/522 |
| | | | | 310/71 |
| 2013/0069457 | A1* | 3/2013 | Kim | H02K 3/522 |
| | | | | 310/71 |
| 2015/0188376 | A1* | 7/2015 | Yamaguchi | H02K 3/522 |
| | | | | 310/71 |
| 2016/0218578 | A1* | 7/2016 | Yamada | H02K 3/522 |

FOREIGN PATENT DOCUMENTS

| | | |
|---|---|---|
| JP | S56-157249 A | 12/1981 |
| JP | 02-119544 A | 5/1990 |
| JP | 05-175037 A | 7/1993 |
| JP | 06-098514 A | 4/1994 |
| JP | 2012-016100 A | 1/2012 |
| KR | 10-2003-0059323 A | 7/2003 |
| KR | 10-0789514 B1 | 12/2007 |
| KR | 10-2011-0048796 A | 5/2011 |

OTHER PUBLICATIONS

Natsuhara, English Translation of JP 1994-098514, 1994.
Office Action dated Apr. 21, 2016 in U.S. Appl. No. 13/890,904.
Partial European Search Report dated May 26, 2017 in European Application No. 13166702.4.
Office Action dated Nov. 1, 2017 in Korean Application No. 10-2012-0056569.

* cited by examiner

MOTOR HAVING AN INSULATOR BODY WITH GUIDE LUGS FOR PREVENTION OF SHORT-CIRCUITING

CROSS-REFERENCE TO RELATED APPLICATIONS

This application is a continuation of U.S. application Ser. No. 13/890,904, filed May 9, 2013, which claims the benefit under 35 U.S.C. §119 of Korean Patent Application Nos. 10-2012-0049185, filed May 9, 2012; and 10-2012-0056569, filed May 29, 2012, which are hereby incorporated by reference in their entirety.

BACKGROUND OF THE DISCLOSURE

Field of Invention

The present disclosure relates to a motor.

Discussion of the Related Art

This section provides background information related to the present disclosure which is not necessarily prior art.

In general, a rotor of brushless motor is configured by press-fitting a shaft into a center of a rotor core and installing a permanent magnet on a periphery. At this time, the permanent magnet may be attached while being exposed to an outside of the rotor core, and a permanent magnet accommodation groove unit may be formed at a position near to the periphery of the rotor core, and the permanent magnet may be inserted into the accommodation groove unit.

In a case the permanent magnet is installed while being exposed to the periphery of the rotor core, there may be an advantage of minimizing the magnetic flux loss, but there is also a disadvantage of the permanent magnet being separated during rotation of the rotor core due to centrifugal force of the rotor core rotating at a high speed, in a case the motor is used for a long time or under a harsh condition. In order to solve the aforementioned disadvantages, a can member formed with resin material for preventing particles in the permanent magnet from scattering is covered on a surface of the permanent magnet, which however disadvantageously deteriorates motor torque due to increased air gap at the magnetic field.

Meanwhile, in a case a permanent magnet accommodation groove unit is formed inside the rotor core, and the permanent magnet is inserted into the permanent magnet accommodation groove unit, the permanent magnet is prevented from being separated, but the motor suffers from another disadvantage in that a motor efficiency relatively deteriorates due to loss in magnetic field because the permanent magnet is positioned inside the rotor core.

In order to prevent the magnetic field from being lost, there is a need of using a permanent magnet having a magnetic force relatively greater than that of a permanent magnet attached to the surface of the rotor core. Generally, a neodymium rare earth magnet is largely used for a permanent magnet having a stronger magnetic force. The neodymium rare earth magnet is a strong permanent magnet formed with rare earth element Nd—Fe—B, and called a neodymium super magnet.

Meanwhile, the neodymium rare earth, one of the main raw materials forming the neodymium rare earth permanent magnet is largely produced in China, and a manufacturing cost of the rotor core has greatly increased recently due to sudden price rise in the rare earth materials. Thus, development of rotor is required recently using a permanent magnet of ferrite material free from rare earth elements, as the increased manufacturing cost of rotor core acts to increase the motor cost.

However, in a case the permanent magnet of ferrite material is used for a rotor of IPM method where the permanent magnet is inserted into a rotor core, saturation of magnetic field is not realized at a rib portion formed in a plurality of cores for inserting a magnet of the rotor core due to relatively weaker magnetic force than that of the conventional rare earth magnet, such that torque becomes relatively weaker due to weak flux linkage and the like, which therefore needs improvement.

Meanwhile, a conventional BLDC (Brushless Direct Current) motor includes a stator installed on a motor housing or a frame, a magnet rotor rotatably inserted into the stator, and a shaft fixedly inserted into a center of the magnet rotor. The stator is formed by a stator core wound by a coil. The stator core is manufactured by stacking a plurality of silicon steel plates, each with a thickness of less than 1 mm, which are punched by a press, where each silicon steel plate includes a cylindrical yoke unit, a plurality of teeth units protruded toward a center of an inner surface of the yoke unit along a circumferential direction, each spaced apart at a predetermined distance, and polarized pole units protrusively formed at distal ends of the teeth unit.

A plurality of slots to be wound by the coil is formed among the teeth units, where the slots are inserted by an insulator of insulating material for insulation between the stator core and the coil. The insulators are air-tightly inserted from both sides into the slots along a stacking direction of the stator core. Meanwhile, the coil may be wound to correspond to polarity of used power, and in a case a 3-phase (U, V, W) power is used, the coils are conductibly connected to mutually different terminals of three polarities. Furthermore, the insulator is integrally provided with a terminal housing coupling unit, where a terminal housing for power supply is press-fitted into the terminal housing coupling unit.

However, in the terminal housing coupling unit formed at the insulator, there may be generated short-circuit in the coils applied with mutually different polarities at a position where the coil and the terminal are conductibly connected. That is, the coils respectively wound on the insulator are alternatively crossed at a connection unit for being wired to a terminal of each polarity, where, although each coil is protected by coating, and if the coating is damaged by repetitive shock and friction, each coil may be short-circuited. In a case each coil of mutually different polarity is generated with short-circuits, the motor may disadvantageously develop a defect including rotation stop and the like.

BRIEF SUMMARY

This section provides a general summary of the disclosure, and is not a comprehensive disclosure of its full scope or all of its features.

Accordingly, the present invention has been made in view of the above-mentioned problems occurring in the prior art, and it is an object of the present invention to provide a motor installed with a rotor configured to improve structure capable of exhibiting a performance equivalent to that of a rotor using a conventional rare earth magnet while using a magnet of termite material.

It should be emphasized, however, that the present disclosure is not limited to a particular disclosure as explained above. It should be understood that other technical subjects not mentioned herein may be appreciated by those skilled in the art.

In one general aspect of the present disclosure, there is provided a motor, the motor comprising: a motor housing; a stator arranged on the motor housing; and a rotor arranged at a center of the stator, wherein the rotor includes a core member centrally coupled to a rotation shaft, a ring-shaped ferrite magnetic member coupled to an outside of the core member to be magnetized with polar anisotropy, and a support unit formed at a complementary position between the core member and the ferrite magnetic member to restrict a relative rotation between the core member and the ferrite magnetic member.

In some exemplary embodiments, each of the core member and the ferrite magnetic member may take a shape of a cylinder.

In some exemplary embodiments, the ferrite magnetic member may be formed with a minor diameter corresponding to an external diameter of the core member.

In some exemplary embodiments, the ferrite magnetic member may be alternatively arranged at a periphery with an S pole and an N pole.

In some exemplary embodiments, the core member may be provided with a through hole insertedly and centrally coupled by a rotation shaft, and is integrally formed with the rotation shaft.

In some exemplary embodiments, the core member may be formed by injection resin.

In some exemplary embodiments, the core member may be formed with any one material of PPS (Polyphenylene Sulfide) and PA9T (Polyamide 9T).

In some exemplary embodiments, the support unit may include a plurality of support ribs formed at a distal end of one side of the core member, and protruded to a circumferential direction of the core member, and a support rib accommodation groove provided in a complementary shape at a position corresponding to that of the support rib of the ferrite magnetic member.

In some exemplary embodiments, a height and a depth of the support rib and those of the support rib accommodation groove may correspond to each other in size.

In some exemplary embodiments, a diameter of the core member and that of the ferrite magnetic member may be formed in a ratio of 1:2 to 1:2.5, and a length of the support rib is within ½ of a diameter of the ferrite support member.

In some exemplary embodiments, the support rib and the support rib accommodation groove may be symmetrically formed about the rotation shaft.

In some exemplary embodiments, the support rib and the support rib accommodation groove may be arranged at a 90° interval about the rotation shaft.

In some exemplary embodiments, the support rib may formed with a length corresponding to a radial length of the ferrite magnetic member.

In some exemplary embodiments, the support rib accommodation groove may be formed on an entire area corresponding to the support rib of the ferrite magnetic member with a length corresponding to the support rib.

In some exemplary embodiments, the support rib may be formed with a tapering unit on a surface opposite to the support rib accommodation groove, where an exposed surface may be formed parallel with an exposed surface of the ferrite magnetic member.

In another general aspect of the present disclosure, there is provided a motor, the motor comprising: an insulator body coupled to a stator core wound with a plurality of coils applied with powers of mutually different polarities to prevent the coil and the stator coil from being short-circuited; a terminal housing coupling unit integrally formed with the insulator body to be coupled to a terminal housing supplying an outside power by being circumferentially protruded; and a coil guide unit formed at the terminal housing coupling unit to prevent coils connected to a terminal of each polarity installed at the terminal housing from being short-circuited.

In some exemplary embodiments, the coil may include first, second and third polarity coils each applied with powers of first, second and third polarities.

In some exemplary embodiments, the coil guide unit may include a first guide lug preventing the first polarity coil from being short-circuited with the second polarity coil; and second and third guide lugs preventing the second polarity coil from being short-circuited with the third polarity coil.

In some exemplary embodiments, each of the first, second and third guide lugs may be formed with a different height.

In some exemplary embodiments, the first guide lug may support the first polarity coil, the second guide lug may support the third polarity coil, and the third guide lug may support the second polarity coil.

In some exemplary embodiments, the second guide lug may be arranged at a position higher than that of the first and second guide lugs.

The motor according to exemplary embodiments of the present disclosure has an advantageous effect in that a rotor core is formed with a permanent magnet using a ferrite instead of rare earth including neodymium, thereby enabling to manufacture a high performance motor with a reasonably cheap price.

Another advantageous effect is that a core is formed with an injection resin instead of a metal material to alleviate shocks caused by vibration by reducing weight of the rotor.

Still another advantageous effect is that coils of each polarity can maintain a predetermined interval using a coil guide unit at a vicinity of a connection unit, where a terminal and coils connected to powers of each polarity are connected, whereby coils of mutually different polarities can be prevented from being short-circuited, even if coating is peeled off by repetitive shocks or frictions generated on the coils of each polarity, to thereby prevent the motor from being operationally malfunctioned by short-circuit on the coils.

BRIEF DESCRIPTION OF THE DRAWINGS

The above and/or other aspects of the present disclosure will become apparent and more readily appreciated from the following description of the exemplary embodiments, taken in conjunction with the accompanying drawings of which.

DETAILED DESCRIPTION

Figure 1:
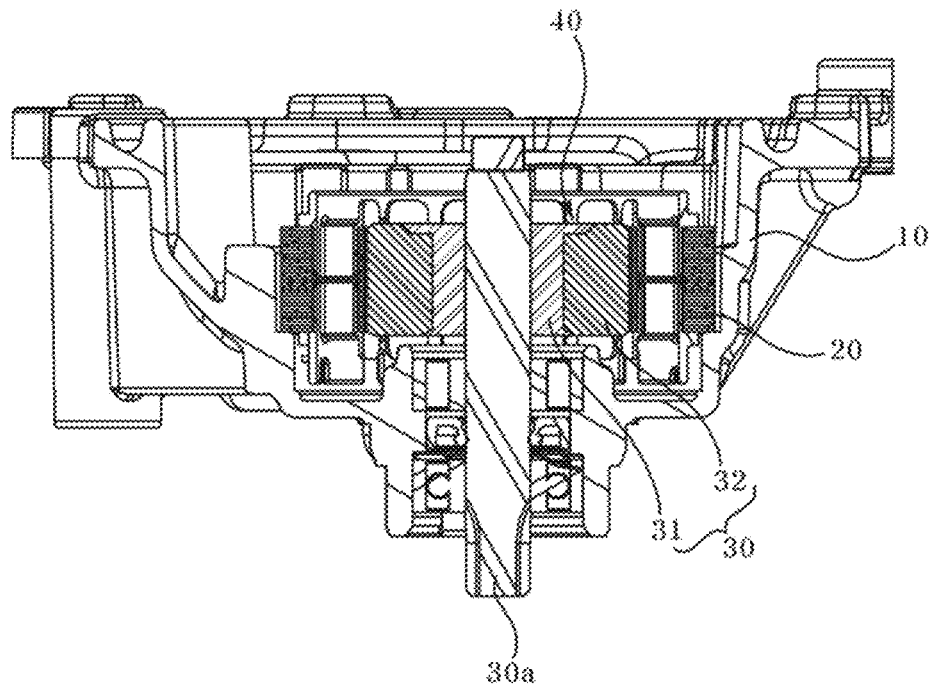
FIG. 1 is a lateral cross-sectional view illustrating a configuration of a motor according to an exemplary embodiment of the present disclosure.

The following description is merely exemplary in nature and is not intended to limit the present disclosure, application, or uses.

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, a motor according to exemplary embodiments of the present disclosure will be described in detail with reference to the accompanying drawings.

Generally, a motor is a device that converts electrical energy into mechanical energy that may generate rotational power in response to electrical interaction between a rotor and a stator, and therefore used as a power source of a mechanical device requiring a motion. The motor is broadly categorized into a DC motor (Direct Current motor) and an AC motor (Alternating Current motor) based on the electrical input power applied thereto.

Generally, the BLDC motor (Brushless DC motor) is a kind of DC motor that may be used to drive an electric appliance and automotive vehicle, but the AC motor is also recently used for an electric vehicle.

The present disclosure may be applicable to various kinds of motors, but in order to facilitate the understanding of the present disclosure, exemplary embodiments of the present disclosure will be illustrated and explained based on the BLDC motor.

Figure 2:
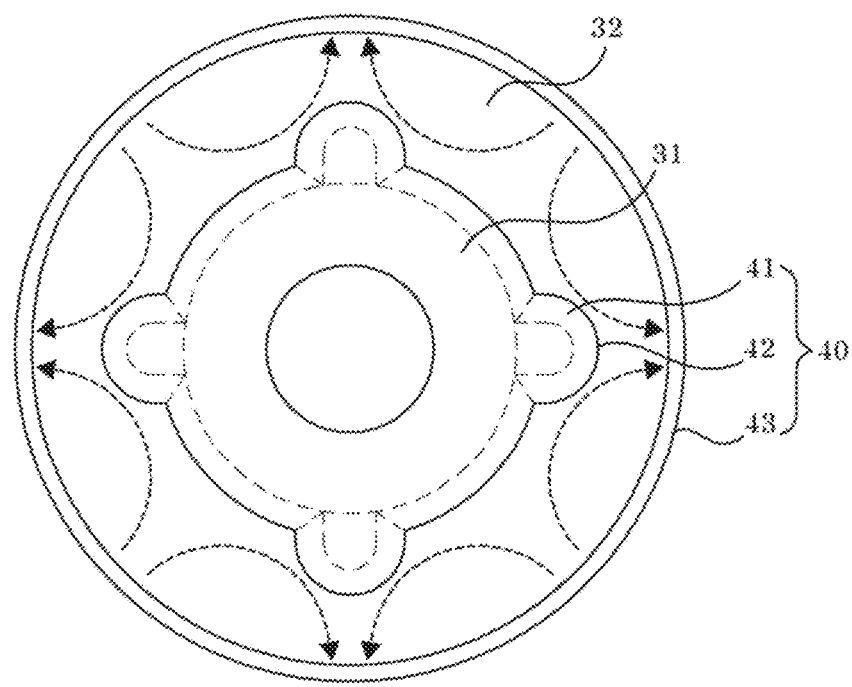
FIG. 2 is a plane view illustrating a rotor core according to a first exemplary embodiment of the present disclosure.
Figure 3:
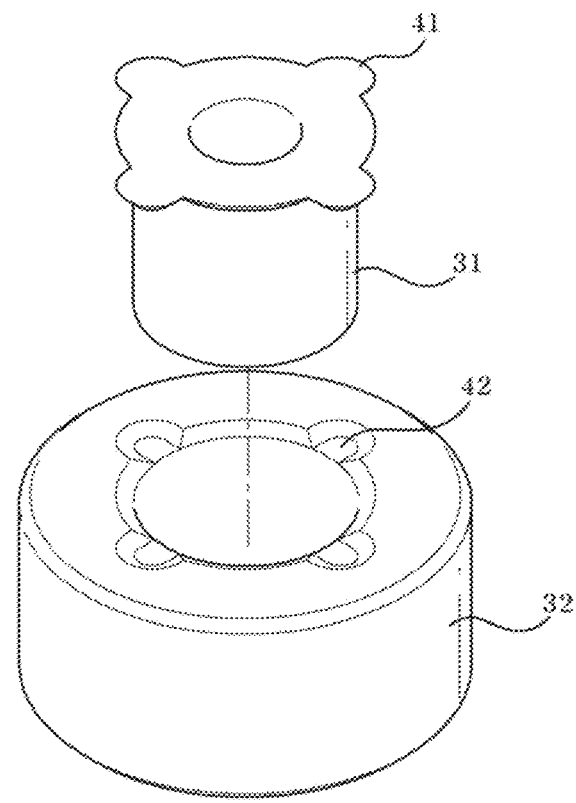
FIG. 3 is an exploded perspective view illustrating the rotor core of FIG. 2.
Figure 4:
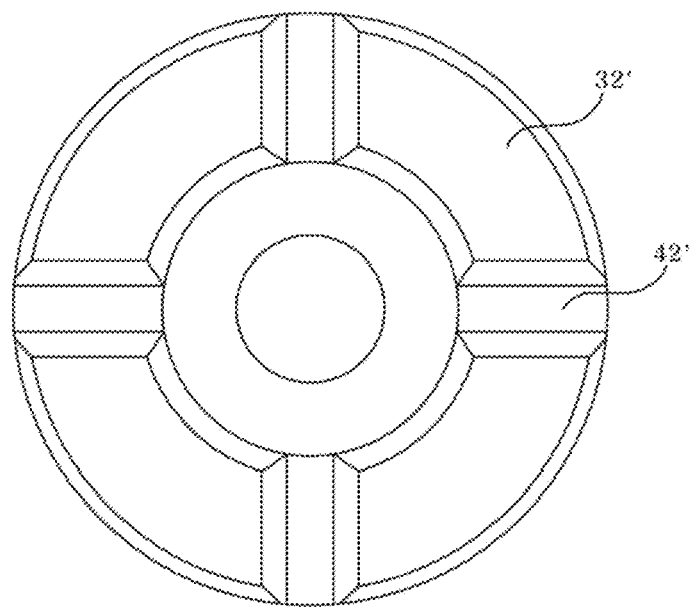
FIG. 4 is a plane view illustrating a rotor core according to a second exemplary embodiment of the present disclosure.
Figure 5:
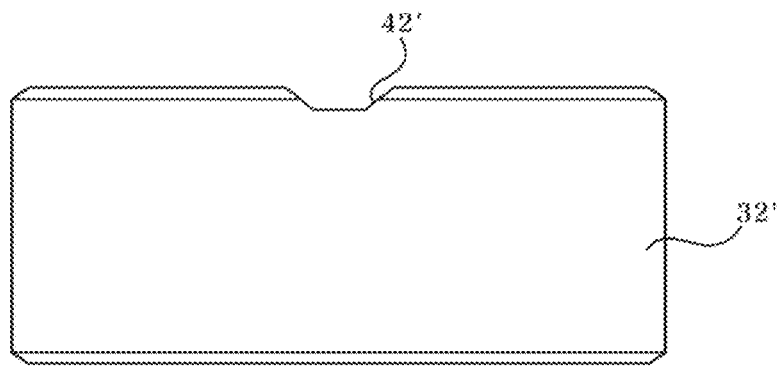
FIG. 5 is a lateral view of FIG. 4.
Figure 6:
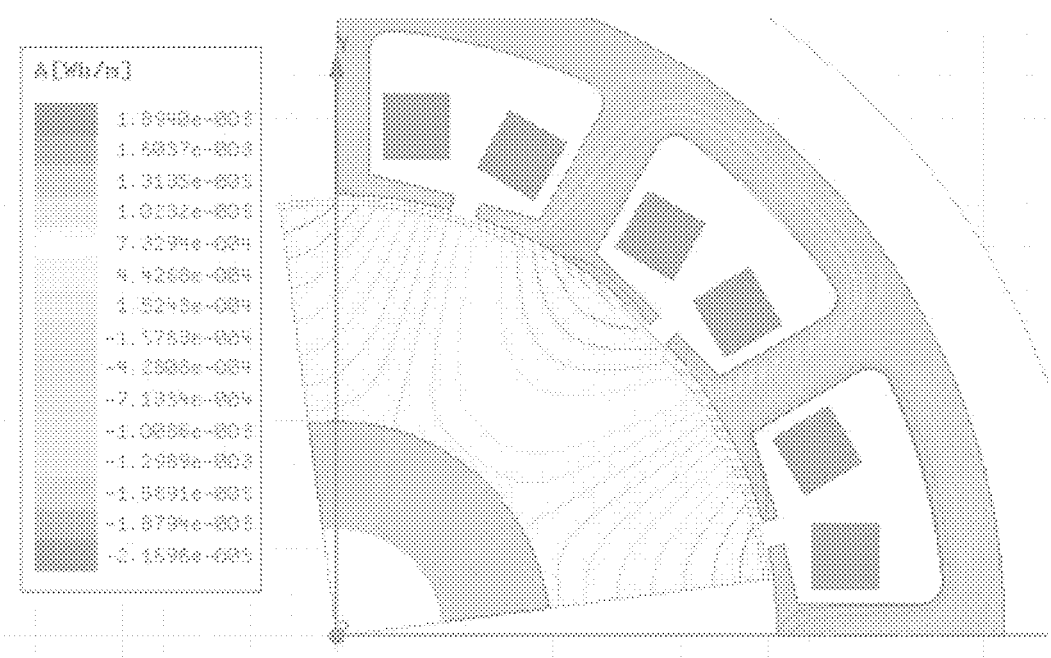
FIG. 6 is a graph illustrating a magnetic flux line of a rotor core according to the present disclosure.

FIG. 1 is a lateral cross-sectional view illustrating a configuration of a motor according to an exemplary embodiment of the present disclosure, FIG. 2 is a plane view illustrating a rotor core according to a first exemplary embodiment of the present disclosure, FIG. 3 is an exploded perspective view illustrating the rotor core of FIG. 2. FIG. 4 is a plane view illustrating a rotor core according to a second exemplary embodiment of the present disclosure, FIG. 5 is a lateral view of FIG. 4, and FIG. 6 is a graph illustrating a magnetic flux line of a rotor core according to the present disclosure.

Referring to FIG. 1, a motor having a rotor core according to the present disclosure includes a motor housing (10), a stator (20), a rotor (30) and a support unit (40).

The motor housing (10) may be provided with an upper surface opened, and fixedly arranged there inside with a stator (20). The motor housing (10) may be variably shaped based on the kinds of used motors. Although not illustrated, in a case a motor used for a DCT (Dual-clutch Transmission) is used, a pair of motor housings (10) as illustrated in FIG. 1 may be provided. At this time, an opened upper surface of the motor housing (10) may be arranged with a power output shaft connected to and released from a rotation shaft (30a) of a rotor (described later) to allow selectively receiving the power outputted by the motor (30).

The DCT, unlike a single clutch transmission installed on a conventional manual transmission, is a system installed with two separate clutches capable of realizing 1 speed, 3 speed and 5 speed using a power transmitted through one clutch, and realizing 2 speed, 4 speed and 6 speed using a power transmitted through the other clutch. That is, in a case it is assumed that the DCT shifts a gear to 1 speed through 6 speed, and in a case number 1 clutch is driving at 1 speed, number 2 clutch is waiting in a state where it has shifted to 2 speed. In a case gearshift starts, the power of number 1 clutch is disconnected and the number 2 clutch is connected. In a driving at 2 speed starts, the number 1 clutch prepares gearshift to 3 speed gear, disengaging 1 speed gear. Accordingly, it only needs to wait for clutch connection for a subsequent gearshift. Due to the above characteristic, the DCI has a fast transmission time, a comfortable drivability and improved fuel economy, Even compared to the conventional mechanical (manual) transmission, the transmission time of the DCT is shorter and exceptional versatility is exhibited. From a performance standpoint, therefore, the DCT closely duplicates the feel and operation of the conventional mechanical transmission.

Generally, the DCT includes a dual clutch formed with two separate clutches, a transmission control unit receiving a power from the dual clutch to set each transmission level, a clutch actuator controlling each clutches of the dual clutch, a transmission actuator implementing the transmission by applying selecting and shifting manipulations to the transmission control unit, and an ECU (Electronic Control Unit) receiving various vehicular information including a vehicle speed and transmission command to electronically control the clutch actuator and the transmission actuator.

Thus, the stator (20) installed at the housing (10) is connected to the output shaft of the rotor (30) by the selecting manipulation of the clutch actuator to allow transmitting a power to each transmission. The stator (20) is provided to an inner side of the motor housing (10), and preferably, the stator (20) may be coupled to a cylindrical stator accommodation unit forming an inner space unit of the motor housing (10).

The stator (20) may be configured such that a plurality of teeth is formed on a metal material stator core for forming a magnetic flux, the teeth is wound with a coil, and power is applied to the coil to form a magnetic field. At this time, the stator core, being installed with an insulator formed with teeth, may be wound with the coil thereon, such that the stator core may be configured with no electricity flowing thereon. Meanwhile, the number of teeth may be increased or decreased depending on size and output capacity of the motor.

The rotor (30) may include a core member (31) centrally coupled by a rotation shaft (30a) and a ferrite magnetic member (32) press-fitted in to the core member (31). The core member (31) is preferably provided with an excellent heat-resistant material, and may be formed with a resin material for weight reduction of the rotor (30). In a case the core member (31) is formed with injection resin instead of metal material, the rotor (30) can be light-weighted to alleviate shocks caused by vibration. The core member (30) may be formed with any one injection resin material of heat-stable PPS (Polyphenylene Sulfide) and PA9T (Polyamide 9T).

Meanwhile, according to an exemplary embodiment of the present disclosure, it is preferable that the core member (31) be directly connected to the rotation shaft (30a). That is, although a through hole is generally formed at a center of the core member (31) and the rotation shaft (30a) is press-fitted into the through hole, the rotation shaft (30a) may be arranged at the center and the core member (31) may be injection-molded at a periphery thereof according to the exemplary embodiment of the present disclosure. According to this configuration, the core member (31) and the rotation shaft (30a) may be prevented from being damaged in the course of the core member (31) being press-fitted by the rotation shaft (30a), and the core member (31) may be also prevented from being separated from the rotation shaft (30a).

Meanwhile, as illustrated in FIGS. 2 and 3, the core member (31) is provided in a shape of a cylinder, but the present disclosure is not limited thereto, and the core member (31) therefore may take various shapes, if necessary. However, the core member (31) being a member that is rotating at a high speed while the rotation shaft (30a) is centrally arranged, the core member (31) is preferred to be symmetrically arranged about the rotation shaft (30a).

The ferrite magnetic member (32) may be shaped of a cylinder having a hollow unit (an opening) as illustrated in FIGS. 2 and 3, and may preferably have a minor diameter corresponding to that of the core member (31). The ferrite magnetic member (32) is characterized by a low price and high stability to temperature.

The ferrite magnetic member (32.) according to an exemplary embodiment of the present disclosure may be formed by a polar anisotropic ferrite sintering method. The performance of the ferrite magnetic member (32) may depend on magnetic characteristic of raw material of ferrite magnetic particles and anisotropic directional properties of magnetic particles formed inside a mold embedded with anisotropic magnetic coil in the forming process.

As explained above, the ferrite magnetic member (32) according to the present disclosure is chemically stable because the ferrite magnetic member (32) is largely formed with a ferromagnetic oxide as a main ingredient, and a polar anisotropic ferrite sintered magnet formed with Sr or Ba ferrite magnetic particles is largely used for the ferrite magnetic member (32).

The ferrite magnetic member (32) may be obtained by the following processes in which an iron oxide, Sr or Ba oxide or carbide are wet mixed, which is then plasticized and coarse ground, the coarse ground magnetic particles are added by sinter enhancing additives such as CaCO3, SiO2, SrCO3 and the like, and finely ground slurries each having a mean grain (particle) diameter of 0.75 μm~1.0 μm. are obtained using a ball mill. The magnetic slurries are dried for dry ferrite particles, which are formed by dry polar anisotropic forming (forming under homogeneous magnetic field) method or by anisotropic radial forming (particles in the magnetic field being radially oriented) method, where the molded compacts are sintered and processed to become a permanent magnet product.

Referring to FIG. 3, the ferrite magnetic member (32) according to an exemplary embodiment of the present disclosure is preferably formed with a ring-shaped permanent magnet, where a magnetic pole alignment of the permanent magnet is of a polar anisotropic alignment. The ferrite magnetic member (32) is preferably formed in one body, and formed by insert injection molding method, which makes the manufacturing cost reduced and simplified.

Specific gravity of the ferrite magnetic member (32) of the rotor (30) thus configured is preferably 7.4~7.8, while specific gravity of core member (31) manufactured by injection resin may be 1.5~1.9.

The ferrite magnetic member (32) is a magnet that has recently re-earned a spot due to sudden increase in price of rare earth element, and increased application scopes as a high efficiency and high performance motor due to recent commercialization as a high performance device. However, magnetic force of the ferrite magnet member (32) is relatively weak, compared to that of the rare earth element magnet, which makes it difficult to make a motor with a high output. These disadvantages are being solved recently through researches into a high densification of the conventional ferrite magnet.

The processes for ferrite magnetic member (32) fall into two general categories based on manufacturing processes; dry process where a powder is molded as a dried material and wet process where the powder is molded as a slurry, and into two general categories based on magnetic direction; isotropic magnet process and anisotropic magnet process. Unlike the isotropic magnets, the anisotropic magnets are excellent in magnetic properties over isotropic magnets because of using additives of high temperature compacted strong magnetic material. A residual flux density by dry process is distributed in the range of 370 mT~420 mT, which is largely used for small sized electronic devices. A residual flux density by wet process is distributed in the range of 380 mT~460 mT, which is largely used for electric motors and actuators. A residual flux density of a magnet of compact size or thin type, one of anisotropic processes, has recently shown an improved magnetic properties of 475 MT which is used for miniaturized motors, whereby ferrite magnets are highly densified.

Meanwhile, the isotropic magnets are differentiated by the anisotropic magnets in that, although the isotropic magnets are formed by press-forming process with a shape of a desired magnetic particle, anisotropic magnets are applied with magnetic fields to a desired anisotropic direction when particles are formed. Thus, a mold structure varies in response to the desired magnetic direction, such that, in a case a ring-shaped magnet according to the present is machined, manufacturing becomes difficult due to size restriction capable of obtaining magnetic field necessary for anisotropicity, as the magnets become smaller.

FIG. 2 illustrates a configuration of multi-pole magnetization with eight (8) poles while maintaining the anisotropic direction by demagnetization through polar anisotropicity for ferrite magnetic member (32) according to an exemplary embodiment of the present disclosure.

The support unit (40) serves to prevent idling phenomenon of the core member (31) and the ferrite magnetic member (32) caused by sudden acceleration and sudden stop of the rotor (30), and includes a support rib (41) provided on the core member (31), and a support rib accommodation groove (42) provided on the ferrite magnetic member (32).

The support rib (41) is preferably formed at a distal end of a side of the core member (31), and according to the first exemplary embodiment of the present disclosure, a plurality of protrusive support ribs (41) may be provided at an upper surface of the core member (31) to an external direction as illustrated in FIGS. 1, 2 and 3.

Meanwhile, preferably, each of the support ribs (41) is provided on a surface opposite to the support rib accommodation groove (42) with a tapering-off shape as illustrated in FIG. 2, while a surface opposite to the said surface is formed with a flat shape.

As illustrated in FIGS. 1 and 2, in a case the core member (31) and the ferrite magnetic member (32) are coupled, an exposed surface may be formed with a flat shape. Furthermore, it is preferably, each of the plurality of support ribs (41) be symmetrically arranged about a center of the core member (31), and as illustrated in FIGS. 2 and 3, it is also preferable that each of the support ribs (41) be arranged at a 90° interval about the center of the core member (31). However, the present disclosure is not limited thereto. By way of non-limiting example, the number of support ribs (41) may be increased and decreased in consideration of rotation speed of the rotor (30).

The support rib accommodation groove (42) may be an upper surface of the ferrite magnetic member (32) and provided in a shape corresponding to that of the support rib (41) at a position corresponding to a position of each of the plurality of support ribs (41). The support rib accommodation groove (42) accommodates the support rib (41) to allow the core member (31) to rotate at a same speed as that of the ferrite magnetic member (32) at all times.

Meanwhile, a height of the support rib (41) and a depth of the support rib accommodation groove (42) may be preferably formed in a mutually corresponding size, and according to an exemplary embodiment of the present disclosure, the height and the depth may be preferably formed in a range of 0.5 mm~3 mm to allow the support rib (41) formed at the core member (31) to restrict a relative rotation of the ferrite magnetic member (32) with a sufficient force.

The reason of restricting the height of the support rib (41) and the depth of the support rib accommodation groove (42) each at a predetermined size is that, if the height of the support rib (41) is formed too low, the core member (31) cannot rotate along with the ferrite magnetic member (12) and idle in a case the rotor suddenly accelerates and stops, and if the height of the support rib (41) is formed too high, the ferrite magnetic member (32) may be damaged during groove forming process of the ferrite magnetic member (32), thereby increasing loss of the ferrite magnetic member (32) and decreasing magnetic force of the ferrite magnetic member (32).

Meanwhile, because the height of the support rib (41) and the depth of the support rib accommodation groove (42) are not fixed values, but may be changed depending on the sizes of the core member (31) and the ferrite magnetic member (32), the above description exemplifies a case where a diameter of the ferrite magnetic member (32), a diameter of the core member (31), and a length of the support rib (41) are set up at 40 mm, 20 mm and 10 mm respectively.

Preferably, ratio between the diameter of the core member (31) and the diameter of the ferrite magnetic member (32) is approximately 1:2 to 1:2.5, where the length of the support rib (41) is preferably formed ½ the diameter of the core member (31).

Meanwhile, referring to FIGS. 4 and 5, a rotor of a motor having a support unit (40) according to the second exemplary embodiment of the present disclosure is configured in such a manner that a shape of a ferrite magnetic member (32') may be partially changed to make a length of the support rib corresponding to a radius of the ferrite magnetic member (32'), and a support rib accommodation groove (42'), having a length corresponding thereto, may be formed across the length of the radius of the ferrite magnetic member (32'). According to this configuration, it is possible to strictly restrict a relative rotation of the ferrite magnetic member (32) relative to the core member (31).

Furthermore, an exterior of the rotor (30) according to the first and second exemplary embodiments of the present disclosure may be formed with a coating layer using a resin as shown in FIG. 2. In this case, the coating layer (43) can serve to maintain a stronger coupling between the rotor core (31) and the ferrite magnetic member (32).

Meanwhile, in a case of the motor having a rotor core according to the present disclosure, a waveform of the counter electromotive force of the motor may be realized in a sine waveform to maximize a motor torque. At this time, because a magnetic flux of a magnetic line of force of a rotor cannot penetrate a rotation shaft (30') as shown in FIG. 6, a magnetic reluctance may be reduced to enlarge a magnetic flux inter-linkage of a coil wound on a stator (20). Furthermore, the rotor (30) can be reduced in weight by dispensing with a back yoke and forming the core member (31) with an injected resin instead of metal material. Now, a motor according to another exemplary embodiment of the present disclosure will be described with reference to the accompanying drawings.

Figure 7:
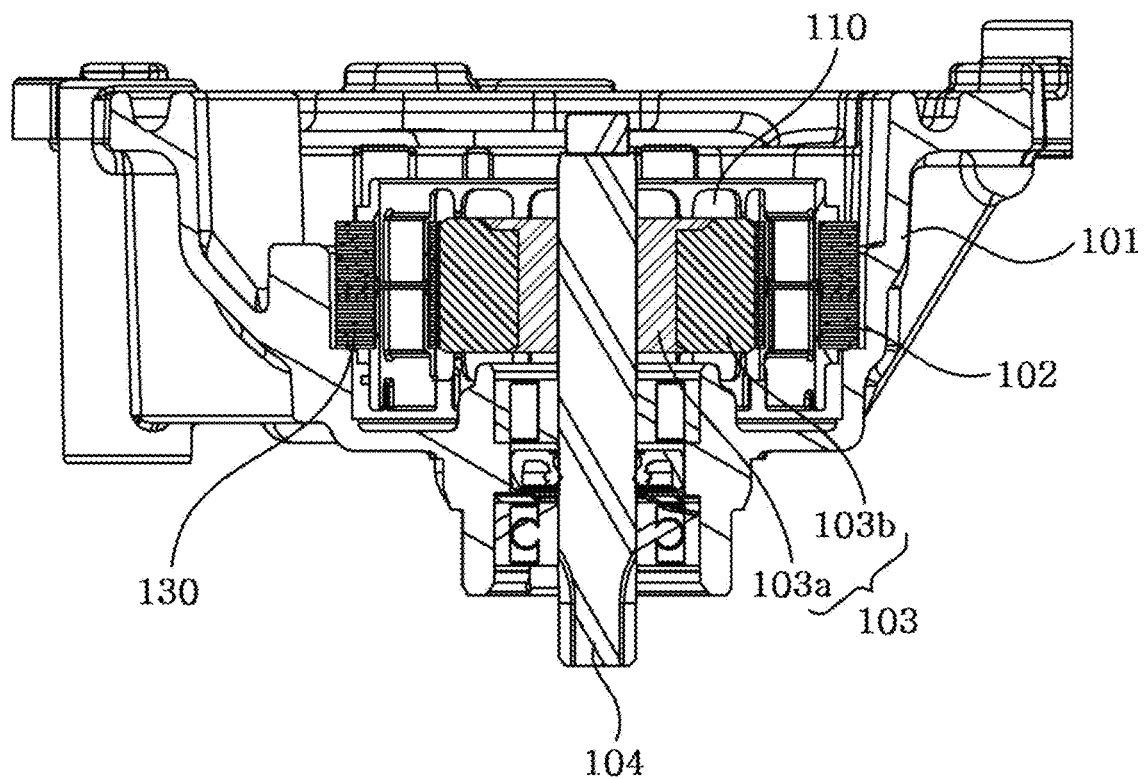
FIG. 7 is a cross-sectional view illustrating a motor according to an exemplary embodiment of the present disclosure.
Figure 8:
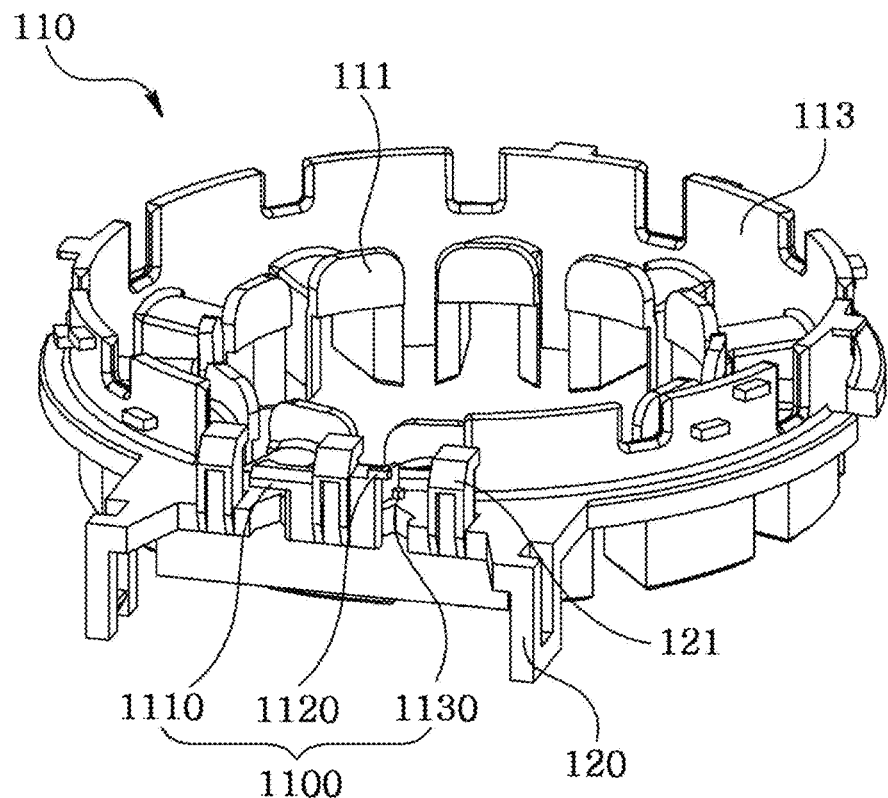
FIG. 8 is a perspective view illustrating an insulator of a motor according to an exemplary embodiment of the present disclosure.
Figure 9:
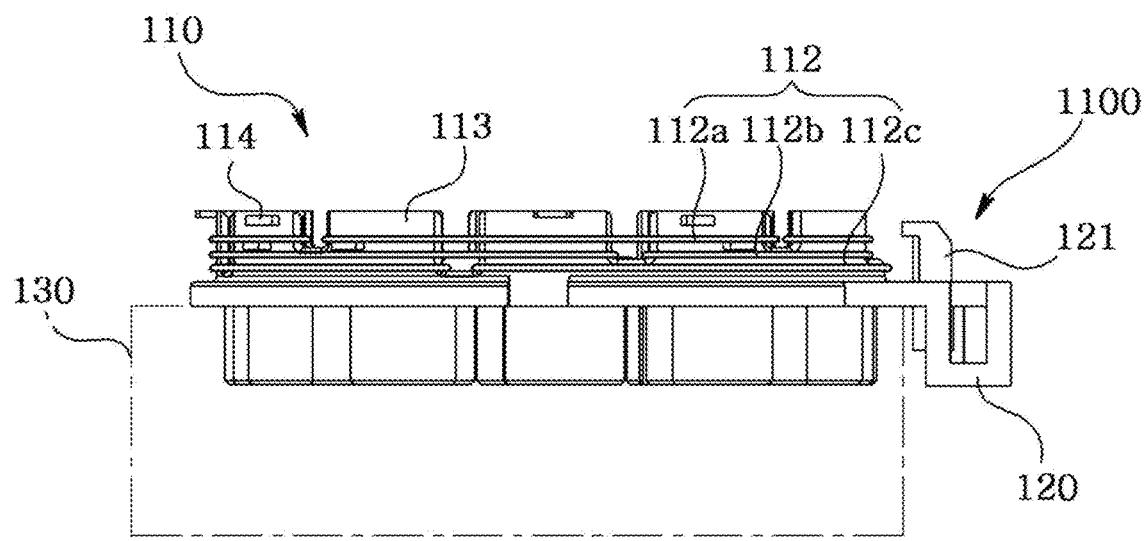
FIG. 9 is a lateral view of FIG. 8.
Figure 10:
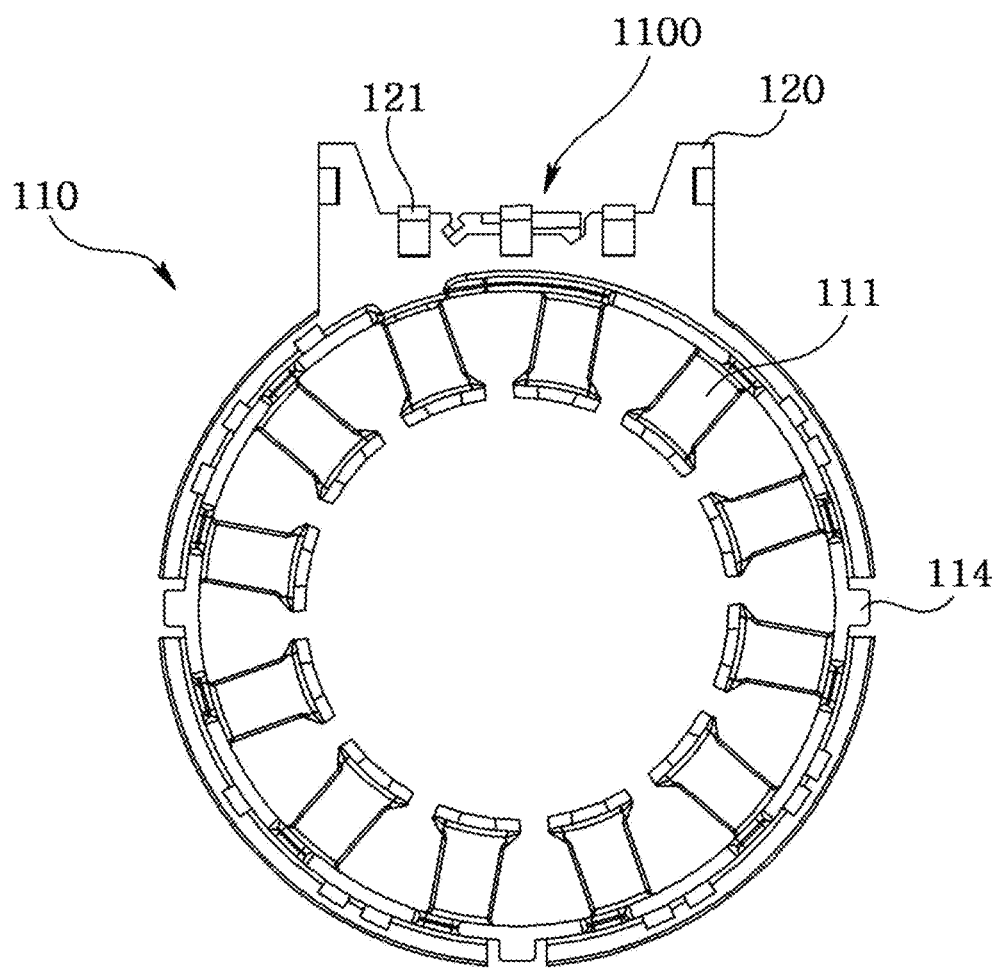
FIG. 10 is a plane view of FIG. 8.
Figure 11:
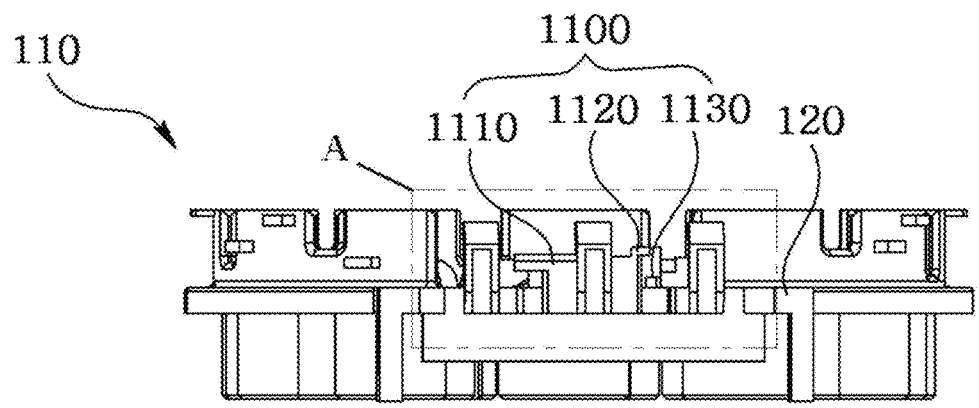
FIG. 11 is a front view of FIG. 8.

FIG. 7 is a cross-sectional view illustrating a motor according to an exemplary embodiment of the present disclosure. FIG. 8 is a perspective view illustrating an insulator of a motor according to an exemplary embodiment of the present disclosure, FIG. 9 is a lateral view of FIG. 8, FIG. 10 is a plane view of FIG. 8, FIG. 11 is a front view of FIG. 8, and FIG. 12, an enlarged view of an essential part of FIG. 11, illustrates a state where a coil is wound and supported by a coil guide formed on a terminal housing coupling unit.

Referring to FIG. 7, the motor according to the present disclosure includes a motor housing (101), a stator (102), a rotor (103) and a rotation shaft (104).

The motor housing (101) may be provided with an upper surface opened and fixedly arranged therein with the stator (102). The motor housing (101) may be variably changed in shape thereof depending on the types of the used motor. In case of a motor used for dual clutch transmission (DCT), the motor housing (101) illustrated in FIG. 7 may be provided in a pair. At this time, the upper surface-opened motor housing (101) may be arranged with a power output shaft connected to or released from the rotation shaft (104, described later) to selectively receive a power outputted from the rotor (103).

The dual clutch transmission, unlike the conventional single clutch transmission mounted on a manual transmission vehicle, is a system installed with two separate clutches capable of realizing 1 speed, 3 speed and 5 speed using a power transmitted through one clutch, and realizing 2 speed, 4 speed and 6 speed using a power transmitted through the other clutch. That is, in a case it is assumed that the DCT shifts a gear to 1 speed through 6 speed, and in a case number 1 clutch is driving at 1 speed, number 2 clutch is waiting in a state where it has shifted to 2 speed. In a case gearshift starts, the power of number 1 clutch is disconnected and the number 2 clutch is connected. In a driving at 2 speed starts, the number 1 clutch prepares gearshift to 3 speed gear, disengaging 1 speed gear. Accordingly, it only needs to wait for clutch connection for a subsequent gearshift. Due to the above characteristic, the DCT has a fast transmission time, a comfortable drivability and improved fuel economy. Even compared to the conventional mechanical (manual) transmission, the transmission time of the DCT is shorter and exceptional versatility is exhibited. From a performance standpoint, therefore, the DCT closely duplicates the feel and operation of the conventional mechanical transmission.

Generally, the DCT includes a dual clutch formed with two separate clutches, a transmission control unit receiving a power from the dual clutch to set each transmission level, a clutch actuator controlling each clutches of the dual clutch, a transmission actuator implementing the transmission by applying selecting and shifting manipulations to the transmission control unit, and an ECU (Electronic Control Unit) receiving various vehicular information including a vehicle speed and transmission command to electronically control the clutch actuator and the transmission actuator.

Thus, the stator (102) installed at the motor housing (101) is connected to the output shaft of the rotor (103) by the selecting manipulation of the clutch actuator to allow transmitting power to each transmission. The stator (102) may be provided to an inner side of the motor housing (101), and preferably, the stator (102) may be coupled to a cylindrical stator accommodation unit forming an inner space unit of the motor housing (101).

The stator (102) may be configured such that a plurality of teeth is formed on a metal material stator core (130) for forming a magnetic flux, the teeth may be wound with a coil (112, see FIG. 9), and power may be applied to the coil to form a magnetic field. At this time, the stator core, being installed with an insulator formed with teeth, may be wound with the coil thereon, such that the stator core may be configured with no electricity flowing thereon. Meanwhile, the number of teeth may be increased or decreased depending on size and output capacity of the motor.

The rotor (103) may include a core member (103a) centrally coupled by a rotation shaft (104) and a magnetic member (103b) press-fitted into the core member (103a).

Meanwhile, as illustrated in FIGS. 7, 8 and 9, the stator (102) may be configured such that the stator core (130) is installed at an upper surface with an approximately ring-shaped insulator body (110). The insulator body (110) may be integrally provided in one body with a terminal housing coupling unit (120) for protrusion at one side. Generally, the insulator body (110) is injection-molded with resin material, such that the terminal housing coupling unit (120) is preferably injection molded with a same material as that of the insulator body (110). The terminal housing coupling unit (120) may be attachably or detachably coupled with a terminal housing (not shown) for connection with a power source unit (not shown).

Referring to FIG. 8, the insulator body (110) may be centrally formed with a plurality of tooth guides (111) to allow being coupled on a one-on-one (1:1) base to a tooth (not shown) centrally formed at the stator core (130) coupled to the insulator body (110). The tooth guide (111) serves to prevent a core (112) wound on the tooth from being short-circuited with the conductive material-formed stator core (130).

Furthermore, the insulator body (110) may be formed at an upper surface with a guide plate (113) to allow the coil (112) to be wound on a periphery. At this time, as illustrated in FIG. 9, each polarity-wise coil (112a, 112b, 112c) may be guided of its winding position by a plurality of lugs (14) to allow being wound on the guide plate (113) with each coil (112a, 112b, 112c) being spaced apart at a predetermined distance. According to this configuration, the each coil (112a, 112b, 112c) can be prevented from being mutually contacted, abraded and short-circuited by an external shock.

The terminal housing coupling unit (120) may be provided with a plurality of terminal connection units (121) as illustrated in the figures. The terminal connection units (121) may he provided in correspondence with the number of polarities of applied power source, and a total of three terminal connection units (121) may be provided as three-phase (U, V, W) power source is supplied in the present exemplary embodiment.

Figure 12:
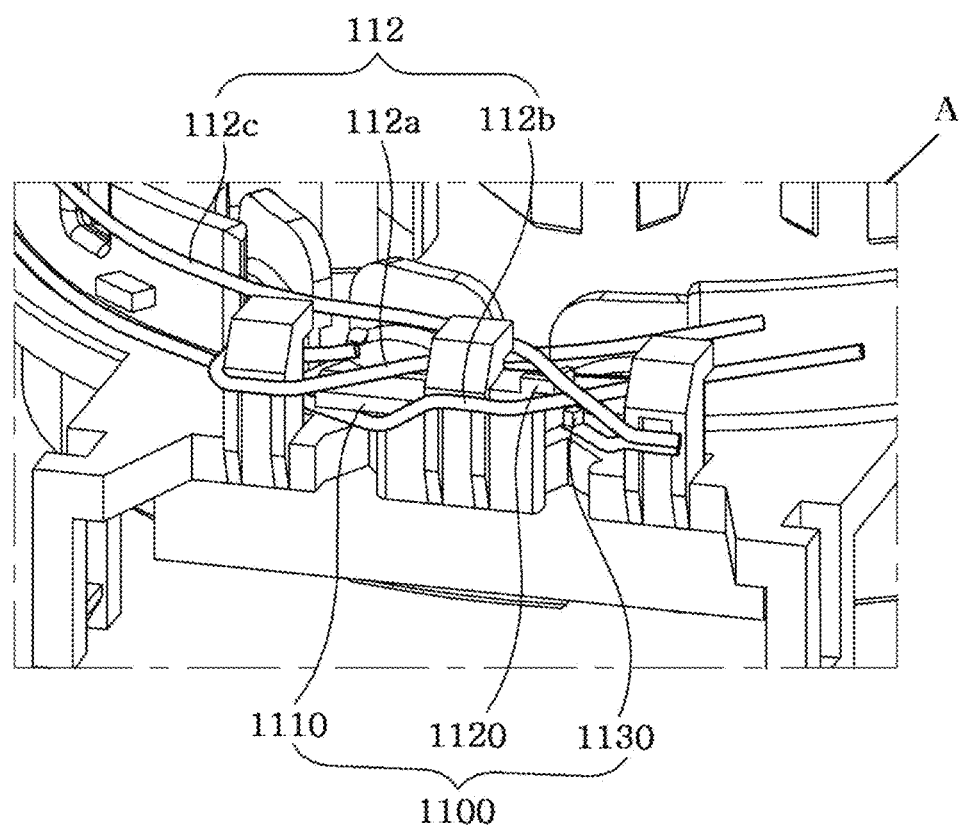
FIG. 12, an enlarged view of an essential part of FIG. 11, illustrates a state where a coil is wound and supported by a coil guide formed on a terminal housing coupling unit.

Meanwhile, as illustrated in FIGS. 10, 11 and 12, the terminal housing coupling unit (120) may be provided with a coil guide unit (1100). The coil guide unit (1100) may include first, second and third guide lugs (1110, 1120, 1130).

The first guide lug (1110) can upwardly support the first polarity coil (112a). At this time, the first guide lug (1110) is provided at a bottom surface with the second polarity coil (112b), as illustrated in FIG. 12, to prevent the first polarity coil (112a) from being short-circuited with the second polarity coil (112b) by the first guide lug (1110).

The second guide lug (1120) can upwardly support the third polarity coil (112c). At this time, the second guide lug (1120) may be arranged at a bottom surface with the second polarity coil (112b) as illustrated in FIG. 12 to prevent the second and third polarity coils (112b, 112c) from being mutually short-circuited.

The third guide lug (1130) can upwardly support the second polarity coil (112b). At this time, the third guide lug (1130) may be arranged at a bottom surface with the third polarity coil (112c) as illustrated in FIG. 12 to prevent the second and third polarity coils (112b, 112c) from being mutually short-circuited.

Meanwhile, the arrangement relationship of the first, second and the third guide lugs (1110, 1120, 1130) is exemplary, and limited to a motor applied with a power of three polarities, such that in a case a motor is applied with a power of two or more polarities, guide lugs corresponding to the number of polarities may be formed. However, a three-phase power is generally used for a commercial motor.

Meanwhile, the first, second and the third guide lugs (1110, 1120, 1130) may be integrally formed with the insulator body (110) and the insulator terminal housing coupling unit (120) formed with resin material. Furthermore, each shape of the first, second and the third guide lugs (1110, 1120, 1130) may take any shape and be positioned at any place , as long as each of the coils (112a, 112b, 112c) is protrusively arranged at a proximate position to prevent from being mutually contacted, as shown in FIG. 12.

According to an exemplary embodiment of the present disclosure, each of the first, second and the third guide lugs (1110, 1120, 1130) may be differently formed in height, and may be prevented from being mutually contacted, in a case each of the coils (112a, 112b, 112c) wound per polarity as shown in FIG. 9 is crossed at a different height. As exemplified by way of FIG. 11, although a height of the second guide lug (1120) may be formed the highest, the present disclosure is not limited thereto, and the protrusion positions of the guide lugs (1110, 1120, 1130) may be changed depending on which position the polarity coil (112) is wound.

Thus, the above mentioned configuration can prevent an erroneous operation such as motor operation stoppage or an defect on the motor, because each live (current-flowing) coil (112a, 112b, 112c) is not short-circuited, even if the motor is generated with repetitive shocks and coil coating is peeled off by friction at contact portions of the coil (112a, 112b, 112c).

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A motor, the motor comprising: an insulator body coupled to a stator core wound with a plurality of coils applied with powers of mutually different polarities to inhibit the coils from being short-circuited; a terminal housing coupling unit integrally formed with the insulator body to be coupled to a terminal housing supplying an outside power by being circumferentially protruded; and a coil guide unit formed at the terminal housing coupling unit to inhibit coils connected to terminals of different polarities installed at the terminal housing from being short-circuited; a total of three terminal connection units formed at the terminal housing coupling unit; and a total of two projection parts projecting radially from an outer circumference of the terminal housing coupling unit;

wherein the plurality of coils includes first, second, and third polarity coils each applied with powers of first, second, and third polarities, respectively;

wherein the coil guide unit includes:

a first guide lug disposed on an upper side of the second polarity coil and a lower side of the first polarity coil to inhibit the first polarity coil from being short-circuited with the second polarity coil;

a second guide lug disposed on an upper side of the second polarity coil and a lower side of the third polarity coil to inhibit the second polarity coil from being short-circuited with the third polarity coil; and a third guide lug disposed on an upper side of the third polarity coil and a lower side of the second polarity coil to inhibit the second polarity coil from being short-circuited with the third polarity coil;

wherein the coil guide unit is formed on the side surface of a terminal connection unit located on a center of the three terminal connection units;

wherein the first guide lug supports the first polarity coil, the second guide lug supports the third polarity coil, and the third guide lug supports the second polarity coil;

wherein the second guide lug is arranged at a position higher than the positions of the first and third guide lugs, wherein the three terminal connection units are disposed between the two projection parts, and wherein the plurality of coils are crossed to an outside and inside of the three terminal connection units.

2. The motor of claim 1, wherein each of the first, second, and third guide lugs is formed with a different height.

* * * * *